(12) United States Patent
Wang et al.

(10) Patent No.: US 11,508,118 B2
(45) Date of Patent: Nov. 22, 2022

(54) PROVISIONING REAL-TIME THREE-DIMENSIONAL MAPS FOR AUTONOMOUS VEHICLES

(71) Applicant: Fujitsu Limited, Kawasaki (JP)

(72) Inventors: Nannan Wang, Allen, TX (US); Xi Wang, Murphy, TX (US); Qi Chen, Denton, TX (US); Paparao Palacharla, Richardson, TX (US); Tadashi Ikeuchi, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 6 days.

(21) Appl. No.: 16/927,312

(22) Filed: Jul. 13, 2020

(65) Prior Publication Data

US 2022/0012939 A1 Jan. 13, 2022

(51) Int. Cl.
| | | |
|---|---|---|
| G06T 15/20 | (2011.01) | |
| G06T 17/05 | (2011.01) | |
| G06T 7/70 | (2017.01) | |
| G05D 1/02 | (2020.01) | |
| G06V 20/58 | (2022.01) | |
| G06V 20/64 | (2022.01) | |

(52) U.S. Cl.
CPC ......... G06T 15/205 (2013.01); G05D 1/0274 (2013.01); G06T 7/70 (2017.01); G06T 17/05 (2013.01); G06V 20/58 (2022.01); G06V 20/647 (2022.01); G05D 2201/0213 (2013.01); G06T 2207/10028 (2013.01); G06T 2207/20084 (2013.01); G06T 2207/30252 (2013.01); G06T 2210/12 (2013.01)

(58) Field of Classification Search
None
See application file for complete search history.

(56) References Cited

U.S. PATENT DOCUMENTS 9,098,754 B1 * 8/2015 Stout .................. G06K 9/00805
10,372,228 B2 * 8/2019 Mao ........................ G06F 3/017
(Continued)

FOREIGN PATENT DOCUMENTS

WO WO-2021114776 A1 * 6/2021 .............. G06K 9/00

*Primary Examiner* — Delomia L Gilliard
(74) *Attorney, Agent, or Firm* — Fujitsu Patent Center

(57) ABSTRACT

Systems and methods for provisioning real-time three-dimensional maps, including: at a first processing stage: updating a three-dimensional map of an environment based on received point cloud data; extracting three-dimensional proposals of objects of the environment; projecting the three-dimensional proposals onto a two-dimensional image of the environment; generating two-dimensional proposals of the objects of the environment; at a second processing stage: detecting the objects of the environment from the two-dimensional image of the environment; generating two-dimensional bounding boxes of the objects of the environment; matching the two-dimensional bounding box with a particular two-dimensional proposal of the two-dimensional proposals; and labeling, for each two-dimensional proposal that is matched to a two-dimensional bounding box, the three-dimensional proposal corresponding to the two-dimensional proposal with semantic information associated with the two-dimensional bounding box that is matched to the two-dimensional proposal to update the three-dimensional map.

21 Claims, 12 Drawing Sheets

(56) References Cited

U.S. PATENT DOCUMENTS

| | | | | |
|---|---|---|---|---|
| 10,872,228 | B1* | 12/2020 | Zhou | G06K 9/00791 |
| 11,151,788 | B2* | 10/2021 | Chaudhuri | G06T 7/246 |
| 2018/0260613 | A1* | 9/2018 | Gao | H04N 5/225 |
| 2019/0138908 | A1* | 5/2019 | Bernat | G06N 3/0454 |
| 2019/0147245 | A1* | 5/2019 | Qi | G06K 9/3233 |
| | | | | 382/103 |
| 2019/0258876 | A1* | 8/2019 | Liu | G06K 9/00805 |
| 2020/0066036 | A1* | 2/2020 | Choi | G06T 7/75 |
| 2020/0209009 | A1* | 7/2020 | Zhang | G06F 3/04815 |
| 2020/0249353 | A1* | 8/2020 | Di Cicco | G01S 17/894 |
| 2021/0001891 | A1* | 1/2021 | Majithia | G01C 21/3833 |
| 2021/0026355 | A1* | 1/2021 | Chen | G06K 9/00791 |
| 2021/0150230 | A1* | 5/2021 | Smolyanskiy | B60W 60/0027 |
| 2021/0174537 | A1* | 6/2021 | Ye | G06K 9/6267 |

* cited by examiner

PROVISIONING REAL-TIME THREE-DIMENSIONAL MAPS FOR AUTONOMOUS VEHICLES

BACKGROUND

Field of the Disclosure

The present disclosure relates generally to the provisioning of real-time three-dimensional maps for autonomous vehicles.

Description of the Related Art

Autonomous vehicles can utilize mapping services for navigating an environment such as a traffic intersection. The mapping services may be processed in a cloud environment, and then downloaded by the autonomous vehicles. However, maps of the traffic intersection that are stored and processed by the cloud environment may be stale, and not include a mapping of the objects (vehicles, pedestrians) currently contained with the environment at the traffic intersection. Processing of such real-time three-dimensional object detection by a central cloud processing environment may be costly in terms of computing power, and network bandwidth; as well as result in time-delays of providing such maps to the autonomous vehicles in a timely fashion such that the autonomous vehicle may safely navigate the environment.

SUMMARY

Innovative aspects of the subject matter described in this specification may be embodied in methods that include the actions of receiving, from two or more autonomous vehicles (AVs), respective point cloud data representative of an environment surrounding the AVs; receiving a two-dimensional image of the environment; at a first processing stage: updating a three-dimensional map of the environment based on the received point cloud data; extracting three-dimensional proposals of objects of the environment; projecting the three-dimensional proposals onto the two-dimensional image of the environment; generating, based on the projecting, two-dimensional proposals of the objects of the environment; at a second processing stage: detecting the objects of the environment from the two-dimensional image of the environment; generating, based on the detected objects, two-dimensional bounding boxes of the objects of the environment, each two-dimensional bounding box including semantic information of the object associated with the two-dimensional bounding box; comparing the two-dimensional proposals of the objects of the environment with the two-dimensional bounding boxes of the objects of the environment; based on the comparing, matching, for one or more of the two-dimensional bounding boxes, the two-dimensional bounding box with a particular two-dimensional proposal of the two-dimensional proposals; and labeling, for each two-dimensional proposal that is matched to a two-dimensional bounding box, the three-dimensional proposal corresponding to the two-dimensional proposal with the semantic information associated with the two-dimensional bounding box that is matched to the two-dimensional proposal to update the three-dimensional map.

Other embodiments of these aspects include corresponding systems, apparatus, and computer programs, configured to perform the actions of the methods, encoded on computer storage devices.

These and other embodiments may each optionally include one or more of the following features. For instance, the first processing stage and the second processing stage are performed in parallel. Detecting the objects of the environment from the two-dimensional image of the environment includes applying an object detection algorithm to the two-dimensional image. The object detection algorithm is a faster region convolutional neural network (faster R-CNN). Extracting the three-dimensional proposal of objects of the environment includes applying a connected component algorithm to the three-dimensional map. Matching the two-dimensional bounding boxes with the particular two-dimensional proposal includes performing an intersection of union (IoU) between the two-dimensional bounding boxes and the two-dimensional proposals. Providing the updated three-dimensional map to the AVs. The semantic information associated with each object includes object classes, object dimensions, and distances between object and AVs. The two-dimensional image of the environment is received from an edge sensor located within the environment. The first processing stage and the second processing stage are performed at one or more edge clouds of a distributed cloud computing environment. Synchronizing the updated three-dimensional map with a core cloud of the distributed cloud computing environment.

Particular implementations of the subject matter described in this specification can be implemented so as to realize one or more of the following advantages. For example, provisioning of real-time three-dimensional maps for autonomous vehicles can provide decreased data latency of such maps to the autonomous vehicles and decreased data size of such maps.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

For a more complete understanding of the present invention and its features and advantages, reference is now made to the following description, taken in conjunction with the accompanying drawings.

DESCRIPTION OF THE EMBODIMENT(S)

Figure 1:
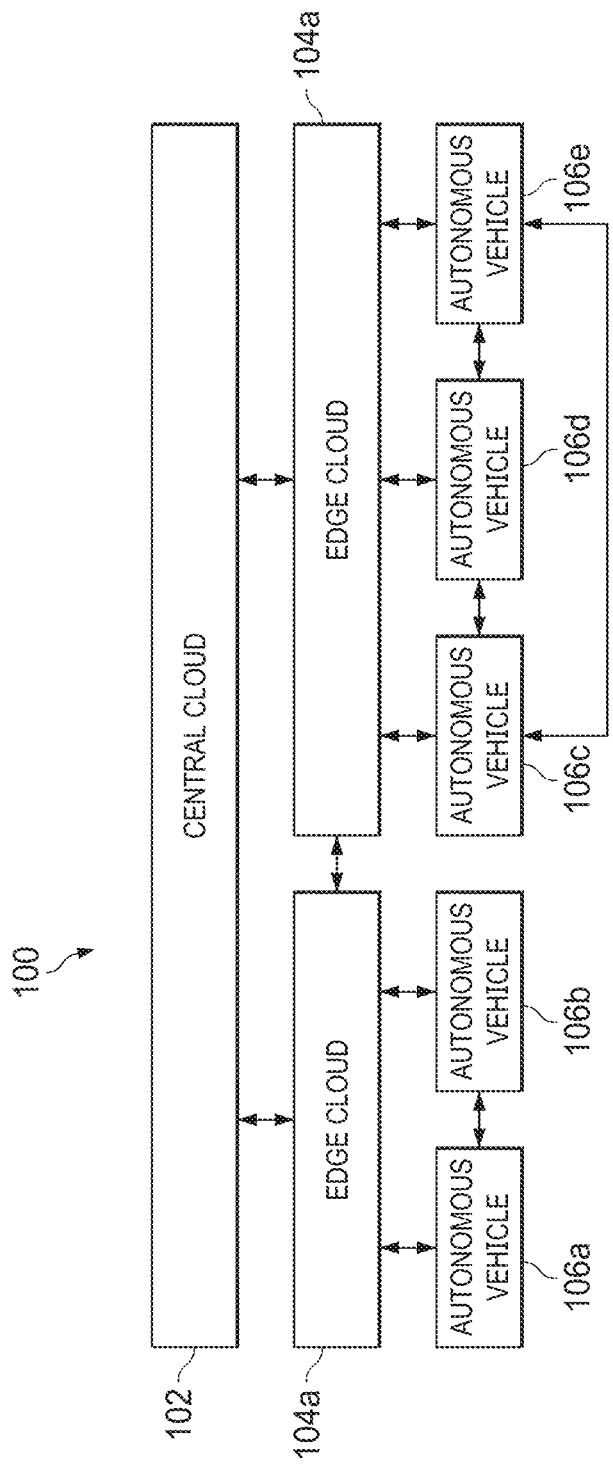
FIG. 1 is a block diagram of selected elements of a computing environment including a central cloud computing network and edge cloud computing networks.

This document describes methods, systems, and computer readable medium for the provisioning of real-time three-dimensional maps for autonomous vehicles. The three-dimensional map of an environment that includes the autonomous vehicles (e.g., a traffic intersection) can be generated at an edge network (as opposed to a core/central network) and provided to the autonomous vehicles. The edge network can be "closer" to the autonomous vehicles as compared to the core/central network in terms of data latency.

To facilitate generating the three-dimensional maps of the environment, the autonomous vehicles can obtain point cloud data representative of the environment (e.g., LIDAR point cloud data) and provide the same to the edge cloud (e.g., over a network interface). Additionally, an edge sensor (e.g., a camera) can obtain a two-dimensional image of the environment (that includes the autonomous vehicles) and provide the same to the edge cloud (e.g., over a network interface). The edge cloud can process the point cloud data (from the autonomous vehicles) and generate a three-dimensional map of the environment.

From the three-dimensional map, the edge cloud can further generate three-dimensional proposals of objects (e.g., cars, pedestrians) within the environment, and project the same onto the two-dimensional image (obtained from the edge sensor) as two-dimensional proposals of the objects. The edge cloud can further perform object detection using the two-dimensional image, and generate two-dimensional bounding boxes representative of the objects (e.g., cars, pedestrians) of the environment. The edge cloud can match the two-dimensional proposals of the objects with the two-dimensional bounding boxes of the objects. For each match, the edge cloud can identify the label associated with the two-dimensional bounding box, and apply such label to the three-dimensional proposal of the object that is associated with the matched two-dimensional proposal. The edge cloud can update the three-dimensional map to include such labels with the three-dimensional proposals of the objects of the environment.

Specifically, this document describes methods and systems that include the actions of receiving, from two or more autonomous vehicles (AVs), respective point cloud data representative of an environment surrounding the AVs; receiving a two-dimensional image of the environment; at a first processing stage: updating a three-dimensional map of the environment based on the received point cloud data; extracting three-dimensional proposals of objects of the environment; projecting the three-dimensional proposals onto the two-dimensional image of the environment; generating, based on the projecting, two-dimensional proposals of the objects of the environment; at a second processing stage: detecting the objects of the environment from the two-dimensional image of the environment; generating, based on the detected objects, two-dimensional bounding boxes of the objects of the environment, each two-dimensional bounding box including semantic information of the object associated with the two-dimensional bounding box; comparing the two-dimensional proposals of the objects of the environment with the two-dimensional bounding boxes of the objects of the environment; based on the comparing, matching, for one or more of the two-dimensional bounding boxes, the two-dimensional bounding box with a particular two-dimensional proposal of the two-dimensional proposals; and labeling, for each two-dimensional proposal that is matched to a two-dimensional bounding box, the three-dimensional proposal corresponding to the two-dimensional proposal with the semantic information associated with the two-dimensional bounding box that is matched to the two-dimensional proposal to update the three-dimensional map.

In the following description, details are set forth by way of example to facilitate discussion of the disclosed subject matter. It should be apparent to a person of ordinary skill in the field, however, that the disclosed embodiments are exemplary and not exhaustive of all possible embodiments.

FIG. 1 illustrates a computing environment 100. The computing environment 100 can include a central (or core) cloud computing network 102 (or central cloud 102), a first edge cloud computing network 104*a* and a second edge cloud computing network 104*b* (collectively referred to as edge cloud computing networks 104, or edge clouds 104), and autonomous vehicles (AVs) 106*a*, 106*b*, 106*c*, 106*d*, 106*e* (collectively referred to as autonomous vehicles 106 or AVs 106).

The edge cloud 104*a* can be in communication with the central cloud 102, the edge cloud 104*b*, and the AVs 106*a*, 106*b*. The edge cloud 104*b* can be in communication with the central cloud 102, the edge cloud 104*a*, and the AVs 106*c*, 106*d*, 106*e*. The AVs 106*a*, 106*b* can be in communication with each other; and the AVs 106*c*, 106*d*, 106*e* can be in communication with each other.

The central cloud 102 and the edge clouds 104 can include computing processors (not shown) and memory media (not shown), which may store executable instructions (i.e., executable code) that may be executable by the processor, which has access to the memory media. The processor may execute instructions that cause a network management system to perform the functions and operations described herein. For the purposes of this disclosure, the memory media may include non-transitory computer-readable media that stores data and instructions for at least a period of time. The memory media may comprise persistent and volatile media, fixed and removable media, and magnetic and semiconductor media. The memory media may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and flash memory; non-transitory media, or various combinations of the foregoing. The memory media is operable to store instructions, data, or both.

Each of the central cloud 102 and the edge clouds 104 can include a network interface (not shown) which may be a suitable system, apparatus, or device operable to serve as an interface between the central cloud 102, the edge clouds 104, and the AVs 106. The network interface may enable communications using a suitable transmission protocol or standard. In certain embodiments, the central cloud 102 and/or the edge clouds 104 may include at least certain portions of a public network, such as the Internet, and can be implemented using hardware, software, or various combinations thereof.

Figure 2:
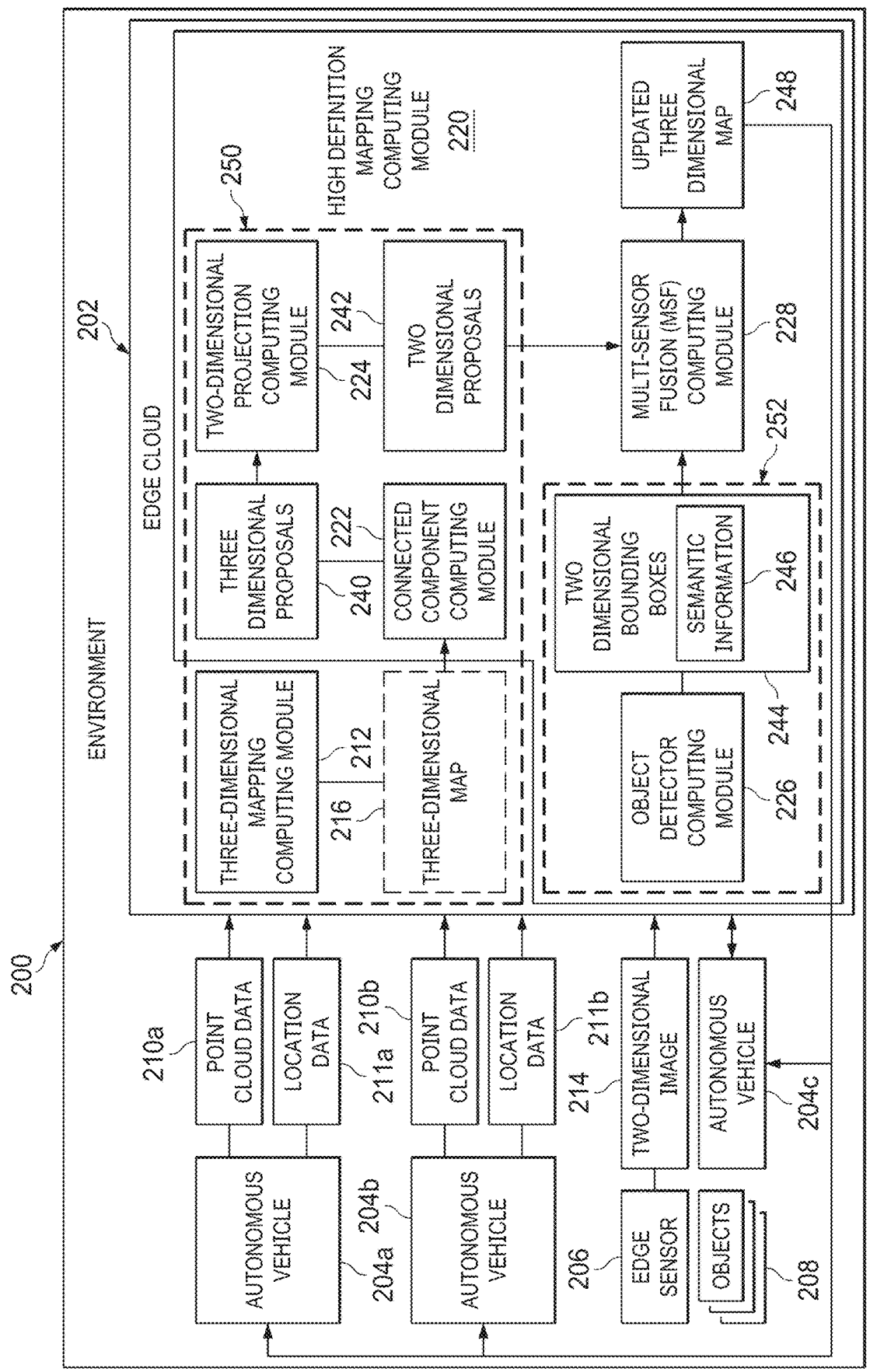
FIG. 2 is a block diagram of selected elements of an environment including components of an edge cloud computing network and autonomous vehicles in communication with the edge cloud.

FIG. 2 illustrates an environment 200 for the provisioning of real-time three-dimensional maps. The environment 200 can include an edge cloud 202. The edge cloud 202 can be similar to either of the edge clouds 104a, 104b of FIG. 1. The environment 200 can further include AVs 204a, 204b (collectively referred to as AVs 204), similar to the AVs 106 of FIG. 1; and an edge sensor 206. The environment 200 can be a physical environment and can include physical objects 208. For example, the objects 208 can include cars, trees, people, traffic signs/lights, and other objects typically included in an environment that surrounds vehicles (such as autonomous vehicles).

Figure 3A:
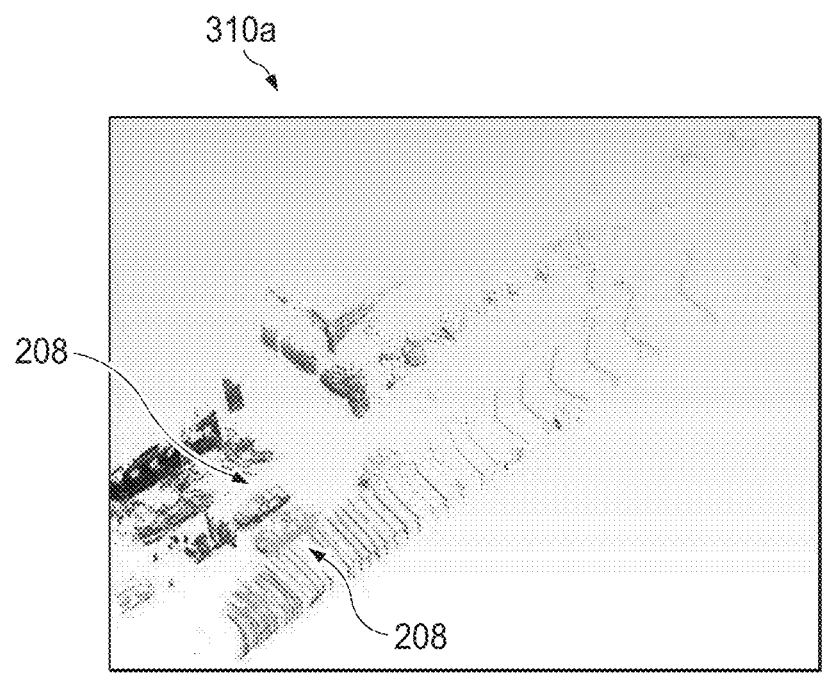
FIGS. 3A and 3B are illustrations of point cloud data obtained from respective autonomous vehicles of the environment.
Figure 3B:
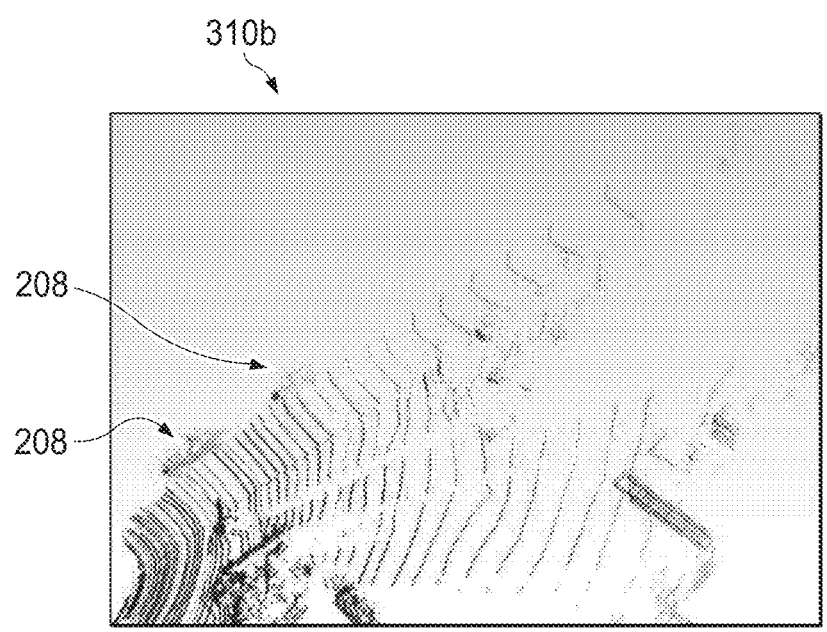

The AVs 204a, 204b can capture point cloud data 210a, 210b (collectively referred to as point cloud data 210); respectively, of a portion of the environment 200. Specifically, the AVs 204 can capture (or obtain) point cloud data 210 that represents the environment 200 from the perspective of the respective AV 204. FIG. 3A illustrates a rendered three-dimensional image 310a representing the point cloud data 210a obtained by the AV 204a of the environment 200 from the perspective of the AV 204a. The image 310a can represent the external surfaces of the objects 208 within the environment 200 from the perspective of the AV 204a (for simplicity of illustration, only a subset of the objects 208 are indicated). FIG. 3B illustrates a rendered three-dimensional image 310b representing the point cloud data 210b obtained by the AV 204b of the environment 200 from the perspective of the AV 204b. The image 310b can represent the external surfaces of the objects 208 within the environment 200 from the perspective of the AV 204b (for simplicity of illustration, only a subset of the objects 208 are indicated).

The AVs 204 can further include a global positioning system (GPS) and/or an inertial measurement unit (IMU) for identifying respective locational and positional information 211a, 211b (collectively referred to as location data 211) of the AVs 204a, 204b. The location data 211 can be with respect to the environment 200, the other AVs 204 in the environment 200, and the objects 208 of the environment 200.

In some examples, the AVs 204 can include LIDAR enabled devices for obtaining the point cloud data 210. That is, the AVs 204 obtain LIDAR point cloud data 210 utilizing a respective LIDAR enabled device included by the respective AV 204.

In some examples, the AVs 204 can include an on-board processor to facilitate capturing the point cloud data 210 and the location data 211 of the AVs 204.

The AVs 204 can additionally include a network interface (e.g., a cellular-enabled network interface) for communicating the point cloud data 210 and the location data 211 of the AVs 204 to the edge cloud 202. In some examples, the point cloud data 210 further includes the location data 211 of the AVs 204.

Figure 4:
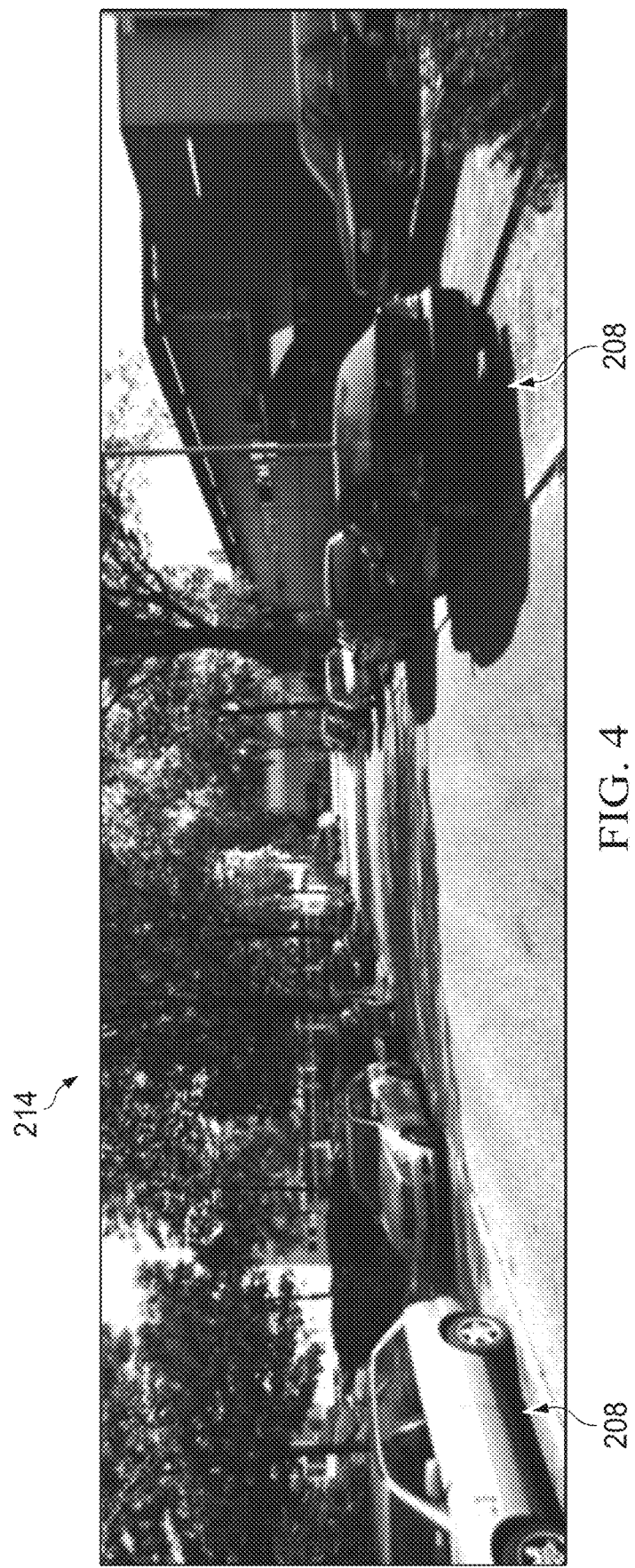
FIG. 4 illustrates a two-dimensional image of the environment obtained by an edge sensor within the environment.

Additionally, the edge sensor 206 can capture a two-dimensional image 214 of a portion of the environment 200. The edge sensor 206 can include a camera to capture (or obtain) the two-dimensional image 214 of the environment 200. For example, the edge sensor 206 can include a traffic camera within the environment 200 that obtains the two-dimensional image 214 of a traffic intersection of the environment 200. FIG. 4 illustrates the two-dimensional image 214 obtained by the edge sensor 206 of the environment 200 from the perspective of the edge sensor 206 (e.g. a camera located within the environment 200). The two-dimensional image 214 is shown including the objects 208 of the environment 200 (for simplicity of illustration, only a subset of the objects 208 are indicated).

The edge sensor 206 can additionally include an on-board processor to facilitate capture the two-dimensional image 214, and a network interface (e.g., a cellular-enabled network interface) for communicating the two-dimensional image 214 to the edge cloud 202.

Figure 5:
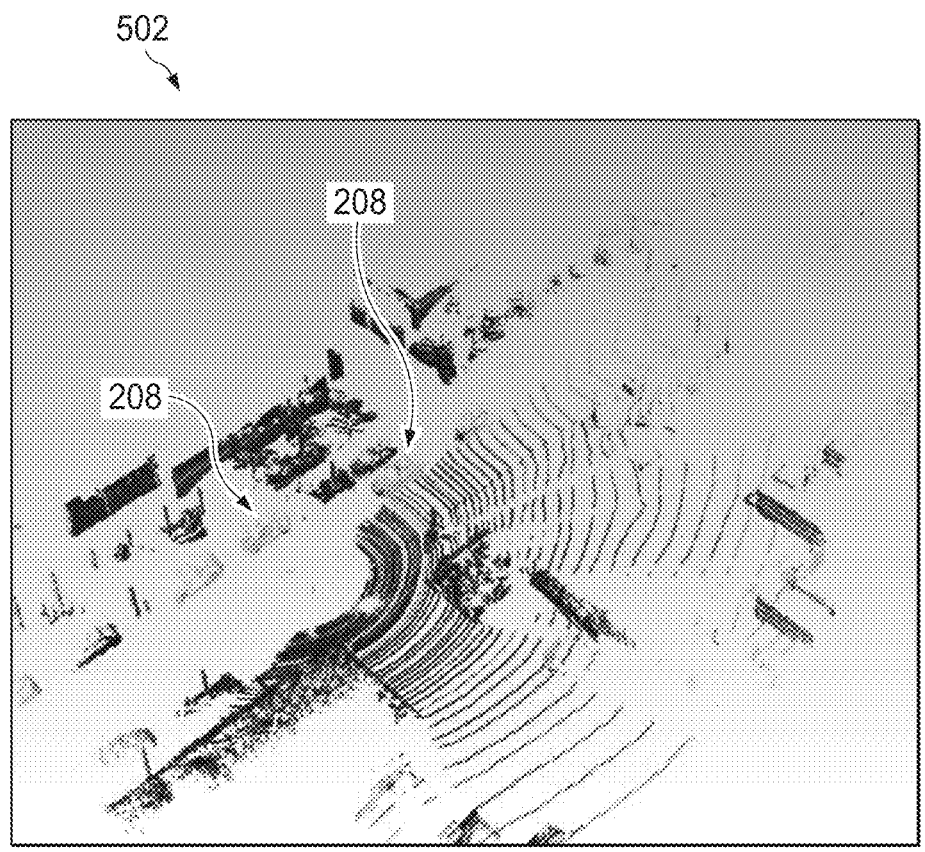
FIG. 5 illustrates a three-dimensional map generated at the edge cloud based on the point cloud data.

The edge cloud 202 can receive the point cloud data 210 and the location data 211 from the AVs 204. Specifically, a three-dimensional mapping computing module 212 of the edge cloud 202 can receive the point cloud data 210 and the location data 211. At a first processing stage 250, the three-dimensional mapping computing module 212 can generate a three-dimensional map 216 based on the point cloud data 210 and the location data 211 (or update a previously existing three-dimensional map based on the point cloud data 210 and the location data 211). The three-dimensional map 216 can be representative of the environment 200 (or a portion of the environment 200). The three-dimensional mapping computing module 212 can aggregate the point cloud data 210 based on the location data 211 associated with each of the AVs 204 to generate the three-dimensional map 216. FIG. 5 illustrates a rendered three-dimensional image 502 representing the three-dimensional map 216 generated by the three-dimensional mapping computing module 212 based on the point cloud data 210 and the location data 211 of the AVs 204 within the environment 200. In other words, FIG. 5 illustrates the rendered three-dimensional image 502 representing the point cloud data 210a obtained by the AV 204a of the environment 200 from the perspective of the AV 204a, and the point cloud data 210b obtained by the AV 204b of the environment 200 from the perspective of the AV 204b. The image 502 can represent the external surfaces of the objects 208 within the environment 200 from the perspective of the AVs 204 (for simplicity of illustration, only a subset of the objects 208 are indicated).

Referring back to FIG. 2, in some examples, the three-dimensional mapping computing module 212 can calibrate the point cloud data 210 with the two-dimensional image 214. Specifically, the three-dimensional mapping computing module 212 can project the point cloud data 210 onto the two-dimensional image 214 to generate a fused two-dimensional image.

Figure 6:
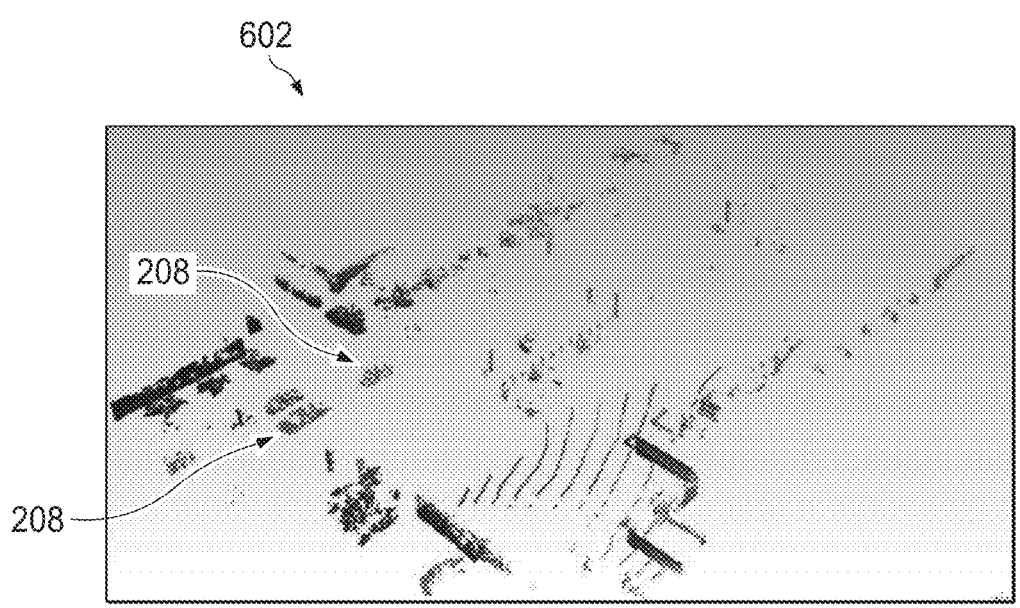
FIG. 6 illustrates the three-dimensional map after foreground point cloud segmentation.

In some examples, the three-dimensional mapping computing module 212 can perform foreground point cloud segmentation of the three-dimensional map 216. Specifically, the three-dimensional mapping computing module 212 can remove background point clouds from the three-dimensional map 216 (e.g., road surfaces of the environment 200). FIG. 6 illustrates a rendered three-dimensional image 602 representing the three-dimensional map 216 after the three-dimensional mapping computing module 212 performs the foreground point cloud segmentation, shown as filtered three-dimensional map 602. In other words, FIG. 6 illustrates the rendered three-dimensional image 602 representing the point cloud data 210a obtained by the AV 204a of the environment 200 from the perspective of the AV 204a, and the point cloud data 210b obtained by the AV 204b of the environment 200 from the perspective of the AV 204b (as shown in the three-dimensional image 502 of FIG. 5) after the three-dimensional mapping computing module 212 performs the foreground point cloud segmentation on the three-dimensional image 502. The image 602 can represent the external surfaces of the objects 208 within the environment 200 from the perspective of the AVs 204 (for simplicity of illustration, only a subset of the objects 208 are indicated).

Referring back to FIG. 2, a high definition mapping computing module 220 of the edge cloud 202 can receive the three-dimensional map 216 from the three-dimensional mapping computing module 212 and the two-dimensional image 214 from the edge sensor 206. The high definition mapping computing module 220 can include a connected component computing module 222, a two-dimensional projection computing module 224, an object detector computing module 226, and a multi-sensor fusion (MSF) computing module 228.

At the first processing stage 250, the connected component computing module 222 can extract three-dimensional proposals 240 of the objects 208 of the environment 200. Specifically, the connected component computing module 222 can utilize a connected component algorithm (e.g., a k-nearest-neighbor connected component algorithm) to extract three-dimensional proposals 240 from the three-dimensional map 216. The three-dimensional proposals 240 are representative of candidate objects of the environment 200. That is, the three-dimensional proposals 240 are proposed identified objects that can relate to the objects 208 of the environment 200. In other words, the three-dimensional proposals 240 are possible objects of the environment 200 that are identified by the connected component computing module 222, and may or may not be one or more of the objects 208 of the environment 200. In some examples, the three-dimensional proposals 240 may lack such identifying data as a category or label of the corresponding object.

In some examples, when the connected component computing module 222 extracts the three-dimensional proposals 240, the connected component computing module 222 can further identify object dimensions of the objects associated with the respective three-dimensional proposals 240. In some examples, when the connected component computing module 222 extracts the three-dimensional proposals 240, the connected component computing module 222 can further identify distances between objects associated with the respective three-dimensional proposals 240 and the AVs 204.

Figure 7:
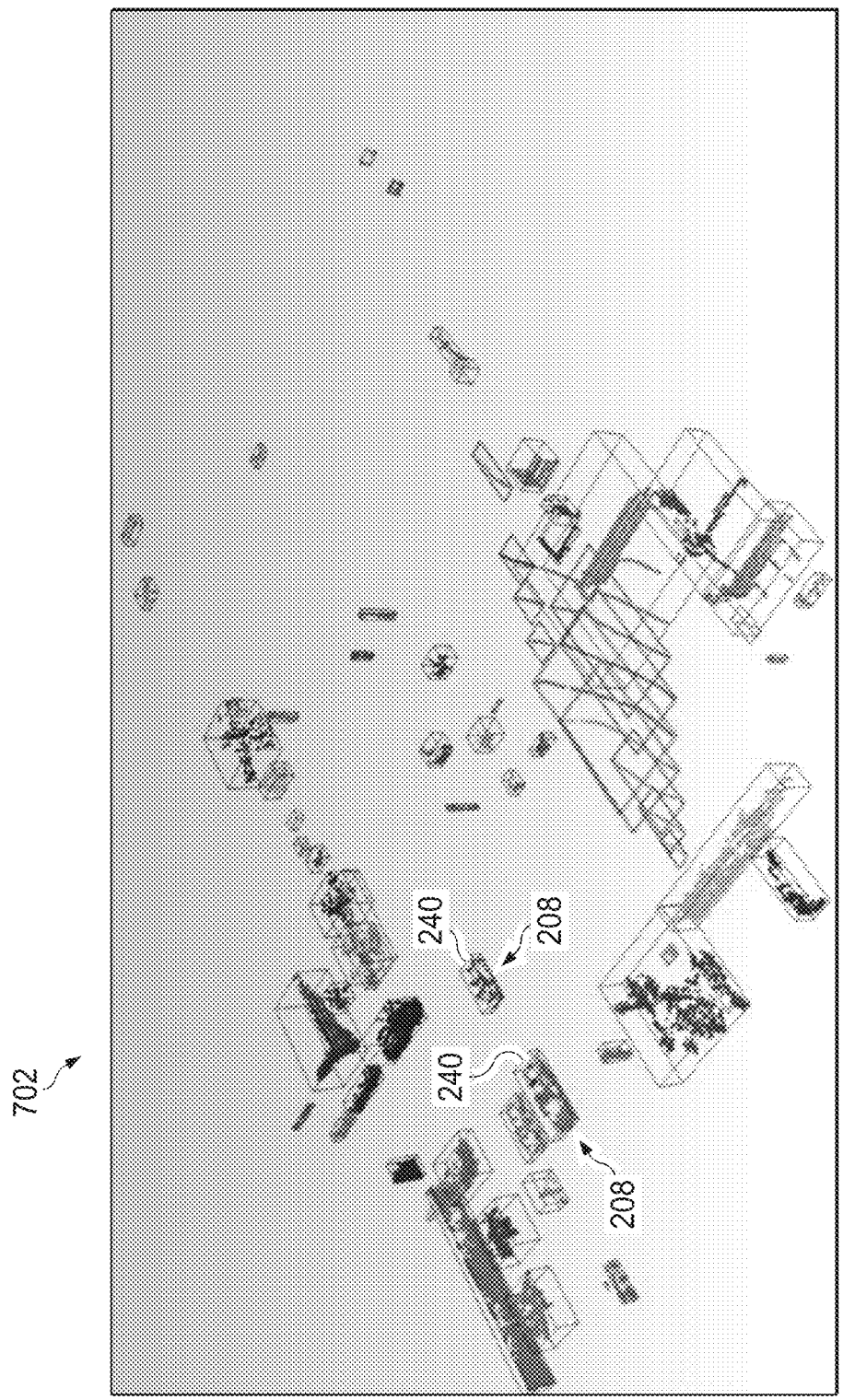
FIG. 7 illustrates the three-dimensional map including three-dimensional proposals of objects of the environment generated at the edge cloud.

In some examples, the connected component computing module 222 can utilize a connected component algorithm (e.g., a k-nearest-neighbor connected component algorithm) to extract three-dimensional proposal 240 from the three-dimensional map 216 after foreground point cloud segmentation, e.g., the filtered three-dimensional map 602. FIG. 7 illustrates a rendered three-dimensional image 702 representing the filtered three-dimensional map 602 including the three-dimensional proposals 240 generated by the connected component computing module 222. In other words, FIG. 7 illustrates the rendered three-dimensional image 702 representing the point cloud data 210 obtained by the AV 204 of the environment 200 including the three-dimensional proposals 240 of the objects 208 of the environment 200 (for simplicity of illustration, only a subset of the three-dimensional proposals 240 of the objects 208 are indicated).

Figure 8:
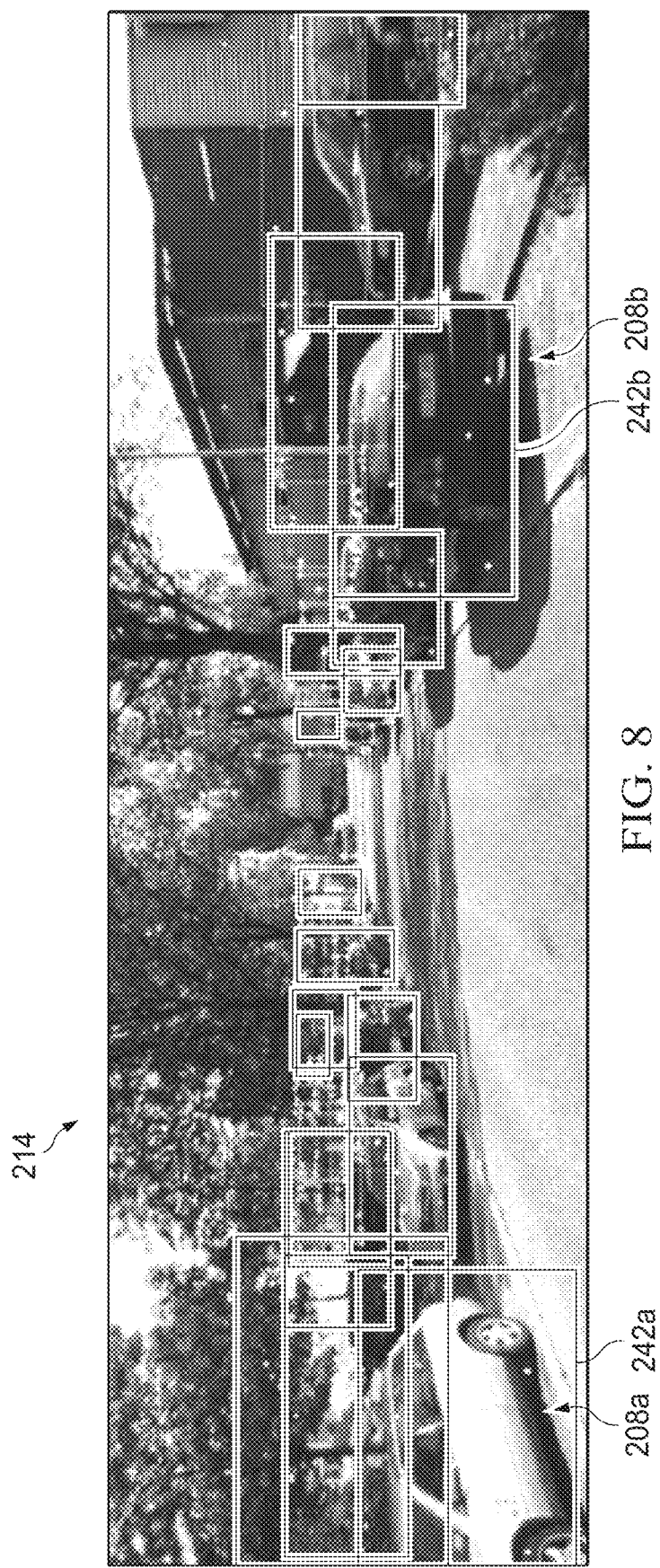
FIG. 8 illustrates the two-dimensional map including two-dimensional proposals of the objects of the environment generated at the edge cloud based on the three-dimensional proposals.

Referring back to FIG. 2, further at the first processing stage 250, the two-dimensional projection computing module 224 can receive the three-dimensional proposals 240 and project the three-dimensional proposals 240 onto the two-dimensional image 214 of the environment 200. Specifically, the two-dimensional projection computing module 224 can project the three-dimensional proposals 240 onto the two-dimensional image 214 to generate two-dimensional proposals 242 of the objects 208 of the environment 200. FIG. 8 illustrates the two-dimensional image 214 including the two-dimensional proposals 242 of the objects 208 of the environment 200 generated by the two-dimensional projection computing module 224 (for simplicity of illustration, only a subset of the two-dimensional proposals 242 of the objects 208 are indicted). For example, the two-dimensional proposal 242a can correspond to the object 208a of the environment 200, and the two-dimensional proposal 242b can correspond to the object 208b of the environment 200.

Referring back to FIG. 2, at a second processing stage 252, the object detector computing module 226 can detect the objects 208 of the environment 200 from the two-dimensional image 214. Specifically, the object detector computing module 226 can include a two-stage detector that can detect such objects as vehicles, pedestrians, lane projections, traffic signs, trees, and buildings that are included by the two-dimensional image 214. In some examples, the object detector computing module 226 can apply an object detection algorithm to the two-dimensional image 214 to detect the objects 208 of the environment 200 from the two-dimensional image 214. For example, the object detector computing module 226 can include a faster region convolutional neural network (faster R-CNN) that employs a deep learning-based object detection method for detecting the objects 208 that are included by the two-dimensional image 214.

Figure 9:
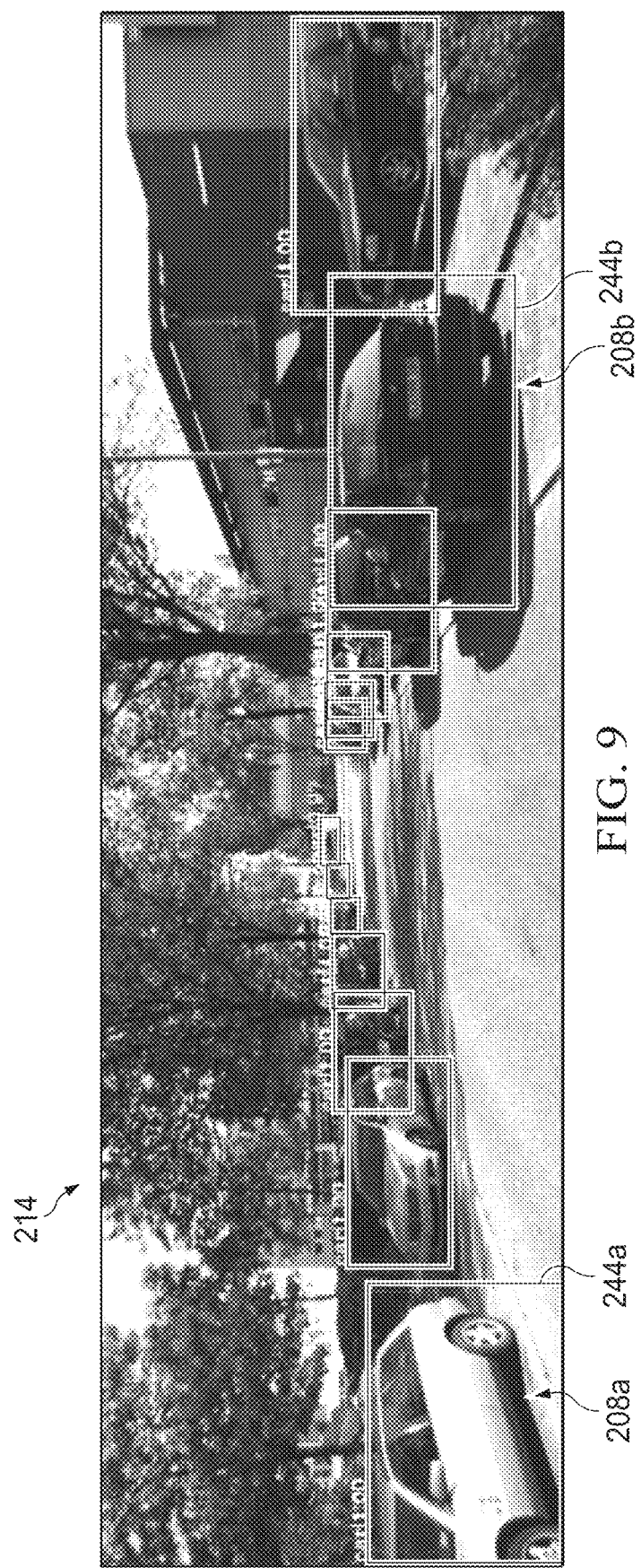
FIG. 9 illustrates the two-dimensional map including two-dimensional bounding boxes of the objects of the environment generated at the edge cloud.

Further, at the second processing stage 252, the object detector computing module 226 can generate two-dimensional bounding boxes 244 of the objects 208 of the environment 200. Specifically, the object detector computing module 226 can generate the two-dimensional bounding boxes 244 based on the detection of the objects 208 of the environment 200 from the two-dimensional image 214. In some examples, the object detector computing module 226 can further identify semantic information 246 associated with the bounding boxes 244. The semantic information 246 can include information associated with the objects 208 that are represented by the respective two-dimensional bounding boxes 244. In some examples, the semantic information 246 can include object classes. In some examples, the semantic information 246 can include a confidence score (e.g., between 0 and 1) indicating a confidence that the object class is correct for each two-dimensional bounding box 244 that represents a particular object 208. FIG. 9 illustrates the two-dimensional image 214 including the two-dimensional bounding boxes 244 of the objects 208 of the environment 200 generated by the object detector computing module 226 (for simplicity of illustration, only a subset of the two-dimensional bounding boxes 244 of the objects 208 are indicted). For example, the two-dimensional bounding box 244a can correspond to the object 208a of the environment 200, and the two-dimensional bounding box 244b can correspond to the object 208b of the environment 200.

In some examples, the first processing stage 250 and the second processing stage 252 are performed in parallel. That is the first processing stage 250 and the second processing stage 252 are executed in parallel by the edge cloud 202. In other words, the first processing stage 250 generates the three-dimensional map 216 based on the point cloud data 210, extracts the three-dimensional proposals 240 of the objects 208, projects the three-dimensional proposals 240 onto the two-dimensional image 214, and generates the two-dimensional proposal 242 while concurrently the second processing stage 252 detects the objects 208 from the two-dimensional image 214 and generates the two-dimensional bounding boxes 244 of the objects 208 for the two-dimensional image 214.

Referring back to FIG. 2, the MSF computing module 228 can receive the two-dimensional proposals 242 from the two-dimensional projection computing module 224 and the two-dimensional bounding boxes 244 (and the semantic information 246) from the object detector computing module 226. The MSF computing module 228 can compare the two-dimensional proposals 242 of the objects 208 of the environment 200 with the two-dimensional bounding boxes 244 of the objects 208 of the environment 200. The MSF computing module 228, based on the comparing, can match, for one or more of the two-dimensional bounding boxes 244, a particular two-dimensional bounding box 244 with a particular two-dimensional proposal 242. Specifically, the MSF computing module 228 can calculate an intersection of union (IoU) between each of the two-dimensional bounding boxes 244 and each of the two-dimensional proposals 242. In some examples, the MSF computing module 228 can calculate the IoU for all two-dimensional proposals 242 for each of the two-dimensional bounding boxes 244. The MSF computing module 228 can then identify the two-dimensional proposal 242 that has a best fit for each of the two-dimensional bounding boxes in 244 in terms of IoU (e.g., the largest IoU).

Figure 10:
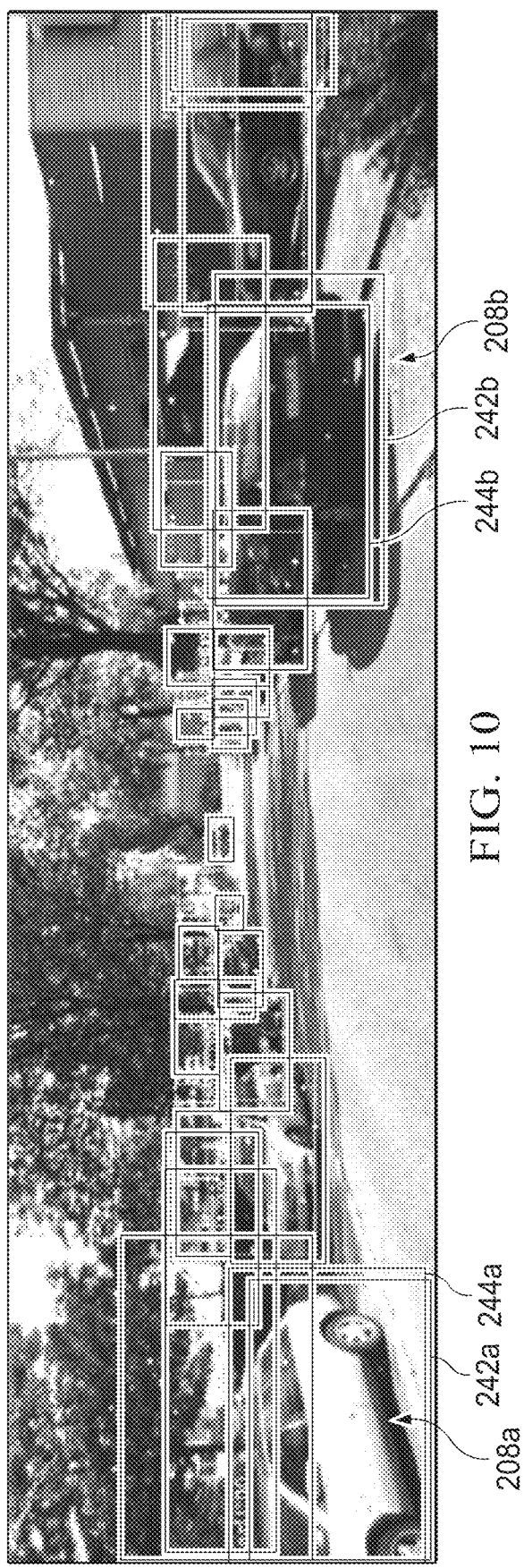
FIG. 10 illustrates the two-dimensional image including the two-dimensional bounding boxes matched with respective two-dimensional proposals performed at the edge cloud.

FIG. 10 illustrate the two-dimensional image 214 including the two-dimensional bounding boxes 244 matched with respective two-dimensional proposals 242 (for simplicity of illustration, only a subset of the two-bounding boxes 244 of the objects 208 that are matched with respective two-dimensional proposals 242 of the objects are indicted). For example, the two-dimensional bounding box 244a is matched with the two-dimensional proposal 242a, and the two-dimensional bounding box 244b is matched with the two-dimensional proposal 242b. Specifically, the MSF computing module 228 can calculate the IoU between the two-dimensional bounding box 244a and each of the two-dimensional proposals 242. The MSF computing module 228, based on the comparing, can identify the two-dimensional proposal 242a as having the largest IoU among all of the two-dimensional proposals 242 for the two-dimensional bounding box 244a. Additionally, the MSF computing module 228 can calculate the IoU between the two-dimensional bounding box 244b and each of the two-dimensional proposals 242. The MSF computing module 228, based on the comparing, can identify the two-dimensional proposal 242b as having the largest IoU among all of the two-dimensional proposals 242 for the two-dimensional bounding box 244b.

Referring back to FIG. 2, the MSF computing module 228 labels, for each two-dimensional proposal 242 that is matched to a two-dimensional bounding box 244, the three-dimensional proposal 240 corresponding to the two-dimensional proposal 242 with the semantic information 246 associated with the two-dimensional bounding box 244 that is matched to the two-dimensional proposal 240 to update the three-dimensional map, shown as updated three-dimensional map 248. Specifically, as mentioned previously, the MSF computing module 228 matches two-dimensional bounding boxes 244 with two-dimensional proposals 242. Each of the two-dimensional proposals 242 is associated with a particular three-dimensional proposal 240—as described above, the two-dimensional projection computing module 224 projects the three-dimensional proposals 240 onto the two-dimensional image 214 to generate two-dimensional proposals 242 of the objects 208.

The MSF computing module 228 determines, for each of the two-dimensional proposals 242 that is matched to a respective two-dimensional bounding box 244, the corresponding three-dimensional proposal 240 that is associated with the two-dimensional proposal 242. The MSF computing module 228 labels the three-dimensional proposals 240 that respectively correspond to two-dimensional proposals 242 that are matched to two-dimensional bounding boxes 244 with the semantic information 246 of the respective two-dimensional bounding boxes 244. In short, for a particular three-dimensional proposal 240, the MSF computing module 228 labels the three-dimensional proposal 240 with the semantic information 246 of the two-dimensional bounding box 244 that matches the two-dimensional proposal 242 that corresponds to the three-dimensional proposal 240.

Figure 11:
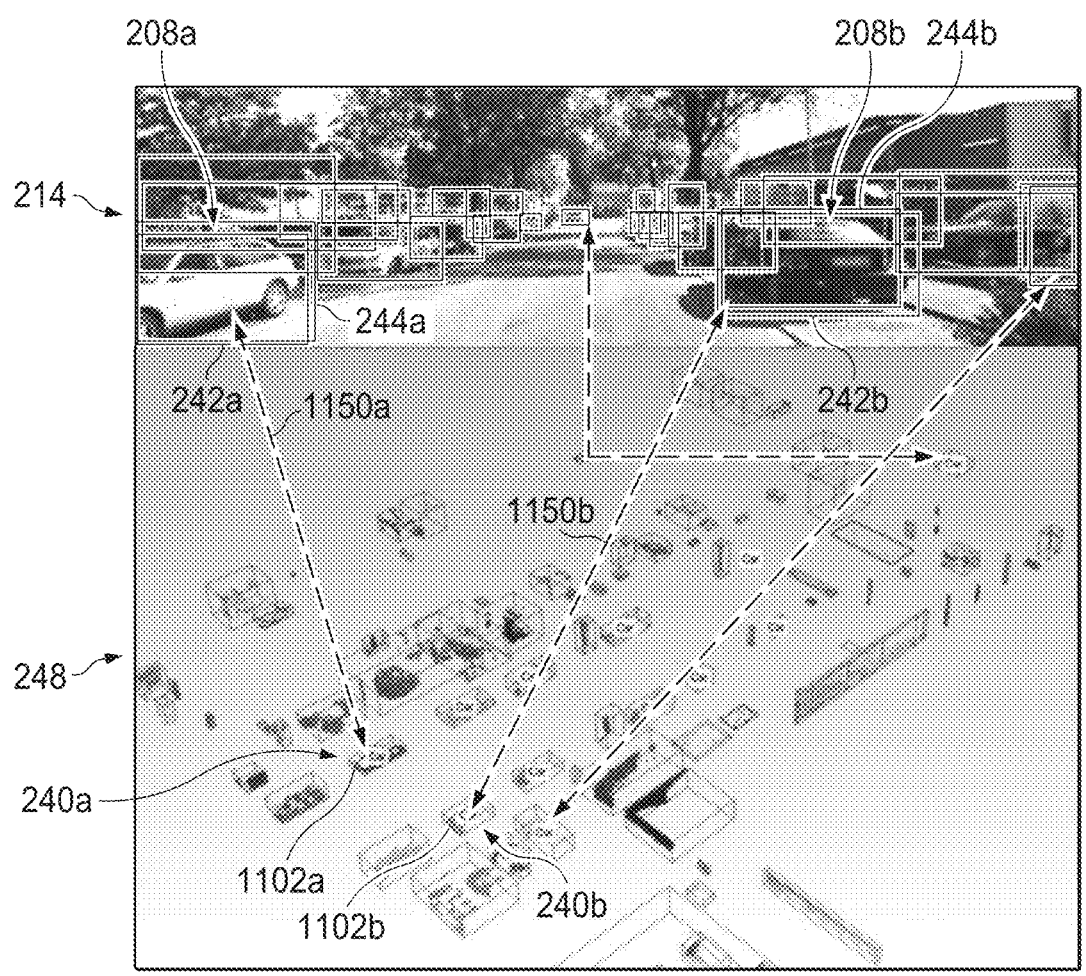
FIG. 11 illustrates the three-dimensional map including labels for the three-dimensional proposals of the objects of the environment performed at the edge cloud.

FIG. 11 illustrates the updated three-dimensional map 248 including labels for the three-dimensional proposals 240 of the objects 208 of the environment 200 (for simplicity of illustration, only a subset of the three-dimensional proposals 240 of the objects 208 are indicted). Specifically, FIG. 11 illustrates the two-dimensional image 214 (obtained by the edge sensor 206) juxtaposed to the three-dimensional map 248 (generated by the edge cloud 202) illustrating the matching between the two-dimensional bounding boxes 244 and the two-dimensional proposals 242, and the associations between the two-dimensional proposals 242 and the three-dimensional proposals 240. For example, also as shown in FIG. 10, the two-dimensional bounding box 244a is matched with the two-dimensional proposal 242a in the two-dimensional image 214. The two-dimensional proposal 242a corresponds to the three-dimensional proposal 240a that is included by the three-dimensional map 248 (shown by arrow 1150a). Thus, the three-dimensional proposal 240a of the three-dimensional map 248 can be labeled with the semantic information 246 that is associated with the two-dimensional bounding box 244a of the object 208 of the environment 200. Specifically, the semantic information 246 can include a label 1102a indicating the class of the object 208 of the environment 200—e.g., "car" object class. To that end, the three-dimensional proposal 240a can be associated with (labeled with) the label 1102a. Additionally, for example, the two-dimensional bounding box 244b is matched with the two-dimensional proposal 242b in the two-dimensional image 214. The two-dimensional proposal 242b corresponds to the three-dimensional proposal 240b that is included by the three-dimensional map 248 (shown by arrow 1150b). Thus, the three-dimensional proposal 240b of the three-dimensional map 248 can be labeled with the semantic information 246 that is associated with the two-dimensional bounding box 244b of the object 208 of the environment 200. Specifically, the semantic information 246 can include a label 1102b indicating the class of the object 208 of the environment 200—e.g., "car" object class. To that end, the three-dimensional proposal 240b can be associated with (labeled with) the label 1102b.

In some examples, referring back to FIG. 2, the edge cloud 202 can provide the updated three-dimensional map 248 to the AVs 204. That is, after the three-dimensional proposals 240 have been updated to include (or be associated with) appropriate labels 1102, the edge cloud 202 can provide the updated three-dimensional map 248 to the AVs 204 that includes the labeled three-dimensional proposals

240. The edge cloud 202 can provide the updated three-dimensional map 248 automatically (e.g., every nanosecond, millisecond, or second); or in response to a request from the AV 204.

In some examples, the edge cloud 202 can provide the updated three-dimensional map 248 to the central (or core) cloud 102, as shown in FIG. 1. The central cloud 102 can share the three-dimensional map 248 with third-parties, such as third-party mapping services.

In some examples, referring back to FIG. 1, an additional autonomous vehicle 204c may be included within the environment 200 after the edge cloud 202 generates the updated three-dimensional map 248. Upon "entering" the environment 200, the autonomous vehicle 204c can notify the edge cloud 202 of its presence (e.g., providing a signal to the edge cloud 202 via a network interface) within the environment 200. The edge cloud 202, upon detecting such a signal, can provide the updated three-dimensional map 248 to the autonomous vehicle 204c. The autonomous vehicle 240c can subsequently provide respective point cloud data and location data to the edge cloud 202 (similar to the AVs 204a, 204a) such that the edge cloud 202 can further update the three-dimensional map, similar to that as described above.

Figure 12:
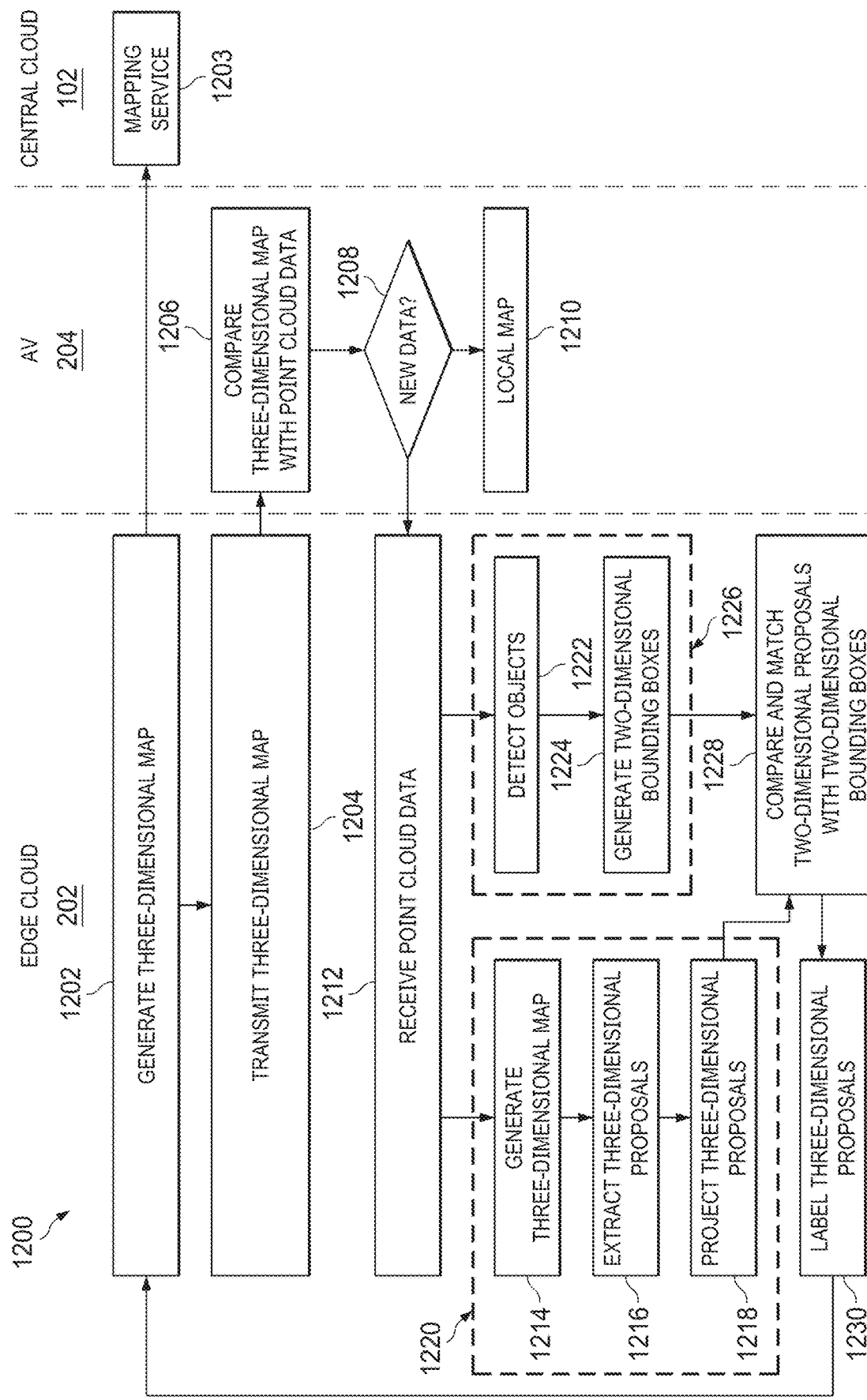
FIG. 12 illustrates a swim-lane diagram depicting selected elements of an embodiment of a method for provisioning of real-time three dimensional maps performed at the edge cloud.

FIG. 12 illustrates a swim-lane diagram depicting selected elements of an embodiment of a method 1200 for provisioning of real-time three dimensional maps. The method 1200 may be performed by the edge cloud 202 and/or the AVs 204 described herein with reference to FIGS. 1-11. It is noted that certain operations described in method 1200 may be optional or may be rearranged in different embodiments.

At 1202, the edge cloud 202 generates the three-dimensional map 216. At 1203, the edge cloud transmits the three-dimensional map 216 to the central cloud 102. At 1204, the edge cloud 202 transmits the three-dimensional map 216 to an AV 204 that is within the environment 200. At 1206, the AV 204 compares the three-dimensional map 216 with point cloud data 210 obtained at the AV 204 and with respect to the AV 204. At 1208, the AV 204 determines if the point cloud data 210 is an update to the three-dimensional map 216. At 1210, if the AV 204 determines that the point cloud data 210 is not an update to the three-dimensional map 216 (e.g., the point cloud data 210 is stale), the AV 204 utilizes the three-dimensional map 216. At 1212, if the AV 204 determines that the point cloud data 210 is an update to the three-dimensional map 216, the AV 204 transmits the point cloud data 210 to the edge cloud 202, and the edge cloud 202 receives the point cloud data 210. At 1214, the edge cloud 202, and in particular, the three-dimensional mapping computing module 212, generates the three-dimensional map 216 based on the point cloud data 210. At 1216, the edge cloud 202, and in particular, the connected component computing module 222, extracts the three-dimensional proposals 240 of the objects 208 of the environment 200. At 1218, the edge cloud, and in particular, the two-dimensional projection computing module 224, projects the three-dimensional proposals 240 onto the two-dimensional image 214 of the environment 200. Steps 1214, 1216, 1218 are included by a first processing stage 1220, similar to the first processing stage 250 of FIG. 2.

At 1222, the edge cloud 202, and in particular, the object detector computing module 226, detects the objects 208 of the environment 200 from the two-dimensional image 214. At 1224, the edge cloud 202, and in particular, the object detector computing module 226, generates the two-dimensional bounding boxes 244 of the objects 208 of the environment 200. Steps 1222, 1224 are included by a second processing stage 1226, similar to the second processing stage 252 of FIG. 2.

At 1228, the edge cloud 202, and in particular, the MSF computing module 228 compares and matches the two-dimensional proposals 242 of the objects 208 of the environment 200 with the two-dimensional bounding boxes 244 of the objects 208 of the environment 200. At 1230, the edge cloud 202, and in particular the MSF computing module 228, labels the three-dimensional proposals 240. The process continues back to step 1202.

In some examples, the first processing stage 1220 and the second processing stage 1226 are performed in parallel. That is the first processing stage 1220 and the second processing stage 1226 are executed in parallel by the edge cloud 202. In other words, the edge cloud 202 generates the three-dimensional map 216 based on the point cloud data 210, extracts the three-dimensional proposals 240 of the objects 208 of the environment 200, and projects the three-dimensional proposals 240 onto the two-dimensional image 214 of the environment 200 while concurrently the second processing stage 1226 detects the objects 208 of the environment 200 from the two-dimensional image 214, and generates the two-dimensional bounding boxes 244 of the objects 208 of the environment 200.

Figure 13:
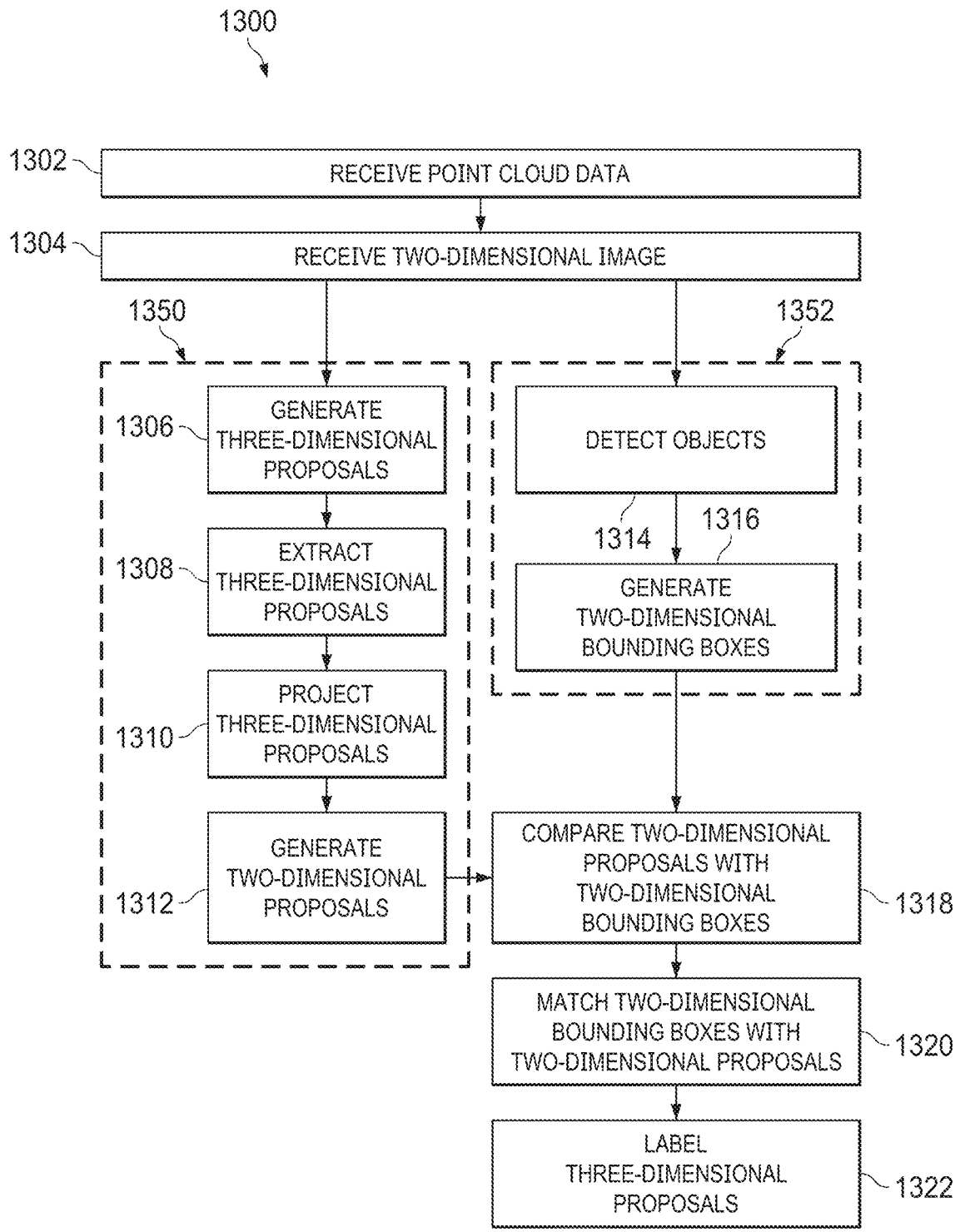
FIG. 13 illustrates a flowchart depicting selected elements of an embodiment of a method for provisioning of real-time three dimensional maps performed at the edge cloud.

FIG. 13 illustrates a flowchart depicting selected elements of an embodiment of a method 1300 for provisioning of real-time three dimensional maps. The method 1300 may be performed by the edge cloud 202 and/or the AVs 204 described herein with reference to FIGS. 1-11. It is noted that certain operations described in method 1300 may be optional or may be rearranged in different embodiments.

At 1302, the edge cloud 202 can receive the point cloud data 210 from the AVs 204. At 1304, the edge cloud 202 can receiving the two-dimensional image 214 of the environment 200 from the edge sensor 206. At 1306, at a first processing stage 1350, the three-dimensional mapping computing module 212 can update (or generate) a three-dimensional map 216 based on the point cloud data 210 and the location data 211. At 1308, at the first processing stage 1350, the connected component computing module 222 can extract three-dimensional proposals 240 of the objects 208 of the environment 200. At 1310, at the first processing stage 1350, the two-dimensional projection computing module 224 can project the three-dimensional proposals 240 onto the two-dimensional image 214 of the environment 200. At 1312, at the first processing stage 1350, the two-dimensional projection computing module 224 can generate the two-dimensional proposals 242 of the objects 208 of the environment 200.

At 1314, at a second processing stage 1352, the object detector computing module 226 can detect the objects 208 of the environment 200 from the two-dimensional image 214. At 1316, at the second processing stage 1352, the object detector computing module 226 can generate the two-dimensional bounding boxes 244 of the objects 208 of the environment 200. At 1318, the MSF computing module 228 can compare the two-dimensional proposals 242 of the objects 208 of the environment 200 with the two-dimensional bounding boxes 244 of the objects 208 of the environment 200. At 1320, the MSF computing module 228, based on the comparing, can match, for one or more of the two-dimensional bounding boxes 244, a particular two-dimensional bounding box 244 with a particular two-dimensional proposal 242. At 1322, the MSF computing module 228 labels, for each two-dimensional proposal 242 that is matched to a two-dimensional bounding box 244, the three-dimensional proposal 240 corresponding to the two-dimensional proposal 242 with the semantic information 246 associated with the two-dimensional bounding box 244 that is matched to the two-dimensional proposal 240 to update the three-dimensional map, shown as updated three-dimensional map 248.

In some examples, the first processing stage 1350 and the second processing stage 1352 are performed in parallel. That is the first processing stage 1350 and the second processing stage 1352 are executed in parallel by the edge cloud 202. In other words, the edge cloud 202 updates (or generates) the three-dimensional map 216, extracts the three-dimensional proposals 240 of the objects 208 of the environment 200, projects the three-dimensional proposals 240 onto the two-dimensional image 214 of the environment 200, and generates the two-dimensional proposals 242 of the objects 208 of the environment 200. while concurrently the second processing stage 1352 detects the objects 208 of the environment 200 from the two-dimensional image 214, and generates the two-dimensional bounding boxes 244 of the objects 208 of the environment 200.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method for provisioning real-time three-dimensional maps, including:
   receiving, from two or more autonomous vehicles (AVs), respective point cloud data representative of an environment surrounding the AVs;
   the receiving receives first point cloud data for a first three-dimensional image from a perspective of a first AV of the two or more AVs from point cloud data of the first AV;
   the receiving also receives second point cloud data for a three-dimensional image from a perspective of a second AV of the two or more AVs from point cloud data of the second AV;
   receiving a two-dimensional image of the environment;
   at a first processing stage:
     aggregating the received point cloud data from the two or more AV;
     generating a three-dimensional map of the environment based on the aggregated point cloud data;
     updating the three-dimensional map of the environment based on the point cloud data from the two or more AVs received following generation of the three-dimensional map;
     extracting three-dimensional proposals of objects of the environment from the updated three-dimensional map, the three dimensional proposals include proposed identified objects that relate to the environment;
     projecting the three-dimensional proposals onto the two-dimensional image of the environment;
     generating, based on the projecting, two-dimensional proposals of the objects of the environment;
   at a second processing stage:
     detecting the objects of the environment from the two-dimensional image of the environment;
     generating, based on the detected objects, two-dimensional bounding boxes of the objects of the environment, each two-dimensional bounding box including semantic information of the object associated with the two-dimensional bounding box;
   comparing the two-dimensional proposals of the objects of the environment with the two-dimensional bounding boxes of the objects of the environment;
   based on the comparing, matching, for one or more of the two-dimensional bounding boxes, the two-dimensional bounding box with a particular two-dimensional proposal of the two-dimensional proposals; and
   labeling, for each two-dimensional proposal that is matched to a two-dimensional bounding box, the three-dimensional proposal corresponding to the two-dimensional proposal with the semantic information associated with the two-dimensional bounding box that is matched to the two-dimensional proposal to update the three-dimensional map.

2. The method of claim 1, wherein the first processing stage and the second processing stage are performed in parallel.

3. The method of claim 1, wherein detecting the objects of the environment from the two-dimensional image of the environment includes applying an object detection algorithm to the two-dimensional image.

4. The method of claim 3, wherein the object detection algorithm is a faster region convolutional neural network (faster R-CNN).

5. The method of claim 1, wherein extracting the three-dimensional proposal of objects of the environment includes applying a connected component algorithm to the three-dimensional map.

6. The method of claim 1, wherein matching the two-dimensional bounding boxes with the particular two-dimensional proposal includes performing an intersection of union (IoU) between the two-dimensional bounding boxes and the two-dimensional proposals.

7. The method of claim 1, further comprising providing the updated three-dimensional map to the AVs.

8. The method of claim 1, wherein the semantic information associated with each object includes object classes, object dimensions, and distances between object and AVs.

9. The method of claim 1, wherein the two-dimensional image of the environment is received from an edge sensor located within the environment.

10. The method of claim 1, wherein the first processing stage and the second processing stage are performed at one or more edge clouds of a distributed cloud computing environment.

11. The method of claim 10, further comprising synchronizing the updated three-dimensional map with a core cloud of the distributed cloud computing environment.

12. The method of claim 1, wherein the updating the three-dimensional map includes
removing background point clouds from the received point cloud data; and
performing foreground point cloud segmentation, wherein
the removing and the performing are based on the received point cloud data from each of the two of more AVs.

13. A system comprising a processor having access to memory media storing instructions executable by the processor to perform operations comprising:
receiving, from two or more autonomous vehicles (AVs), respective point cloud data representative of an environment surrounding the AVs;
the receiving receives first point cloud data for a first three-dimensional image from a perspective of a first AV of the two or more AVs from point cloud data of the first AV;
the receiving also receives second point cloud data for a three-dimensional image from a perspective of a second AV of the two or more AVs from point cloud data of the second AV;
receiving a two-dimensional image of the environment;
at a first processing stage:
aggregating the received point cloud data from the two or more AV;
generating a three-dimensional map of the environment based on the aggregated point cloud data;
updating three-dimensional map of the environment based on the point cloud data from the two or more AVs received following generation of the three-dimensional map;
extracting three-dimensional proposals of objects of the environment from the updated three-dimensional map, the three dimensional proposals include proposed identified objects that relate to the environment;
projecting the three-dimensional proposals onto the two-dimensional image of the environment;
generating, based on the projecting, two-dimensional proposals of the objects of the environment;
at a second processing stage:
detecting the objects of the environment from the two-dimensional image of the environment;
generating, based on the detected objects, two-dimensional bounding boxes of the objects of the environment, each two-dimensional bounding box including semantic information of the object associated with the two-dimensional bounding box;
comparing the two-dimensional proposals of the objects of the environment with the two-dimensional bounding boxes of the objects of the environment;
based on the comparing, matching, for one or more of the two-dimensional bounding boxes, the two-dimensional bounding box with a particular two-dimensional proposal of the two-dimensional proposals; and
labeling, for each two-dimensional proposal that is matched to a two-dimensional bounding box, the three-dimensional proposal corresponding to the two-dimensional proposal with the semantic information associated with the two-dimensional bounding box that is matched to the two-dimensional proposal to update the three-dimensional map.

14. The system of claim 13, wherein the first processing stage and the second processing stage are performed in parallel.

15. The system of claim 13, wherein detecting the objects of the environment from the two-dimensional image of the environment includes applying an object detection algorithm to the two-dimensional image.

16. The system of claim 15, wherein the object detection algorithm is a faster region convolutional neural network (faster R-CNN).

17. The system of claim 13, wherein extracting the three-dimensional proposal of objects of the environment includes applying a connected component algorithm to the three-dimensional map.

18. The system of claim 13, wherein matching the two-dimensional bounding boxes with the particular two-dimensional proposal includes performing an intersection of union (IoU) between the two-dimensional bounding boxes and the two-dimensional proposals.

19. The system of claim 13, the operations further comprising providing the updated three-dimensional map to the AVs.

20. The system of claim 13, wherein the semantic information associated with each object includes object classes, object dimensions, and distances between object and AVs.

21. An edge cloud device for provisioning real-time three-dimensional maps, comprising:
a memory; and
a processor coupled to the memory and configured to include:
a first processing stage, including:
a three-dimensional mapping computing module configured to receive point cloud data for a first three-dimensional image from a perspective of a first AV of the two or more AVs from point cloud data of the first AV, receive second point cloud data for a second three-dimensional image from a perspective of a second AV of the two or more AVs from point cloud data of the second AV, aggregate the received point cloud data from the two or more AV, generate a three-dimensional map of the environment based on the aggregated point cloud data, and update a three-dimensional map of an environment that includes autonomous vehicles using point cloud data representative of the environment that is received from the autonomous vehicles;
a connected component computing module configured to extract three-dimensional proposals of objects of the environment from the updated three-dimensional map, the three dimensional proposals include proposed identified objects that relate to the environment; and a two-dimensional projection computing module configured to i) project the three-dimensional proposals onto a two-dimensional image of the environment, and ii) generate, based on the projecting, two-dimensional proposals of the objects of the environment;

a second processing stage, including:

an object detector computing module configured to i) detect the objects of the environment from the two-dimensional image of the environment and ii) generate, based on the detected objects, two-dimensional bounding boxes of the objects of the environment, each two-dimensional bounding box including semantic information of the object associated with the two-dimensional bounding box;

a multi-sensor fusion (MSF) computing module configured to:

i) compare the two-dimensional proposals of the objects of the environment with the two-dimensional bounding boxes of the objects of the environment;

ii) based on the comparing, match, for one or more of the two-dimensional bounding boxes, the two-dimensional bounding box with a particular two-dimensional proposal of the two-dimensional proposals; and iii) label, for each two-dimensional proposal that is matched to a two-dimensional bounding box, the three-dimensional proposal corresponding to the two-dimensional proposal with the semantic information associated with the two-dimensional bounding box that is matched to the two-dimensional proposal to update the three-dimensional map.

* * * * *